INVENTOR.
SANG Y. WHANG
BY Jackson + Jones
ATTORNEYS

Dec. 22, 1970 SANG Y. WHANG 3,550,005

EQUALIZATION CIRCUIT

Filed March 1, 1968 4 Sheets-Sheet 3

EQUALIZATION CIRCUIT

Filed March 1, 1968

4 Sheets-Sheet 4

1

3,550,005
EQUALIZATION CIRCUIT

Sang Y. Whang, Miami, Fla., assignor to Milgo Electronic Corporation, Miami, Fla., a corporation of Florida Filed Mar. 1, 1968, Ser. No. 709,608
Int. Cl. H04b *1/10*
U.S. Cl. 325—65 22 Claims

ABSTRACT OF THE DISCLOSURE

A rapid, simple-to-adjust variable equalizer circuit for use in data transmission systems is disclosed. The equalization circuit is connected at a receiver station, and it receives an output signal from a narrow bandpass-limited communication link which requires amplitude and delay compensation. At the transmitter, test patterns are generated for transmission over the communication link. A squelch circuit at the transmitter removes certain predetermined signal combinations from selected modulation intervals prior to transmission. The communication link may include narrow bandpass filters which form a composite link having a linear phase. A signal wave-form for a selected carrier frequency under ideal conditions is amplitude-peaked at the middle of its modulation interval and drops toward zero in the middle of adjacent succeeding and successive modulation intervals provided that the signals in those adjacent intervals were squelched for the given test pattern. At the receiver location the received signal is automatically sampled at precisely the locations where low amplitude is expected. The samples that are obtained are integrated and applied to a NULL meter. An operator can rapidly and simply vary the delay and amplitude characteristics of the equalizer by adjusting taps thereon until the lowest reading on a NULL meter is obtained for a variety of test patterns.

CROSS REFERENCE TO RELATED APPLICATIONS

This application is related to two other applications filed concurrently herewith and assigned to the same assignee as is the present application. Such other applications include an invention entitled "Derived Clock From Carrier Envelope," having Ser. No. 709,609, filed on even date herewith by inventor Sang Y. Whang and assigned to the same assignee as is the present application; and an application entitled "Digital Angle Modem," having Ser. No. 709,761, filed on even date herewith by the inventors Robert G. Ragsdale and Paul E. Payne and assigned to the same assignee as is the present application.

BACKGROUND OF THE INVENTION

(1) Field of the invention

Variable equalization includes widespread uses in communication links having widely different amplitude and delay characteristics. Typical examples include commercial, military, and foreign unconditioned voice-grade telephone lines.

(2) Description of the prior art

Variable equalization as known to the prior art is characterized as the custom upgrading of a communication line in its amplitude and delay characteristics by an adjustable device so that the composite characteristic of the line and the device used for equalization is relatively constant for a wide band of frequencies. Adjustment for such wide frequency bands have, in the past, required careful and critical line conditioning through individual adjustment of many knobs which control the amplitude and delay characteristics of the composite line and its equalizer.

2

Such critical adjustment is expensive, time-consuming and requires highly skilled operators. Even with highly skilled operators, equilization over wide freqeuncy bands normally takes an hour or more to satisfactorily equalize a line; thus tying up expensive equipment and costly communication links merely for the purpose of trying to place it in condition for its intended use, namely, data transmission. Furthermore, such equalizers require an additional amount of costly testing equipment to maintain equalization throughout high-speed data transmission whenever some line change takes place. Such equalization, in accordance with the prior art, has included attempts at high speed and automatic equalization; however, such devices are not yet available prior to the advent of this invention.

SUMMARY OF THE INVENTION

A data transmission system having transmitting and receiving devices connectable together in a signal transmission path by random selection of at least one telephone line from among a plurality of telephone lines each having signal transmission characteristics which require balancing in their amplitude and in their delay amounts is described. A carrier frequency having predetermined successive modulation periods is modulated with data levels selected to form a test pattern, and at the transmitter the signals in certain selected modulation periods are squelched before the signal is transmitted over a randomly selected telephone line. At least one, and perhaps, several filters form a filter network having a composite characteristic which is a substantially linear phase passband. This passband width is defined as $1/T$ Hz. in cycles per seconds. Due to the filtering, the signal received after transmission over the unconditioned telephone line is an analog signal distorted somewhat but still substantially having a minimum amplitude at the mid-point of adjacent precedent and successive modulation periods provided that the signals in such periods were squelched at the transmitter. A clock signal at the testing device in the receiver samples the amplitude at the middle of the squelched modulation periods and applies the sampled amounts through an integrator to a NULL meter. An operator can simply and rapidly adjust a plurality of resistors on a variable equalizer to achieve a low reading on the NULL meter for each series of successively received test signals. During the adjustment time, a level detector automatically inhibits the sampling operation whenever the detected signal exceeds a predetermined value in amplitude thus indicating the peak of a non-squelched signal is upcoming.

A test sample, including a series in which every other modulation period is squelched, is followed by a test series in which double modulation periods are squelched on both sides of individual transmitted signals. These test series provide low amplitude samplings at every expected and critical low amplitude point defined by an ideal single modulation wave-form. Such a test series thereby assures beneficial equalization in the quickest possible time over a narrow bandwidth of this invention.

BRIEF DESCRIPTION OF THE DRAWING

The foregoing features and objects of this invention may be more fully appreciated by reference to the accompanying drawing in which.

DESCRIPTION OF THE PREFERRED EMBODIMENT

Figure 1:
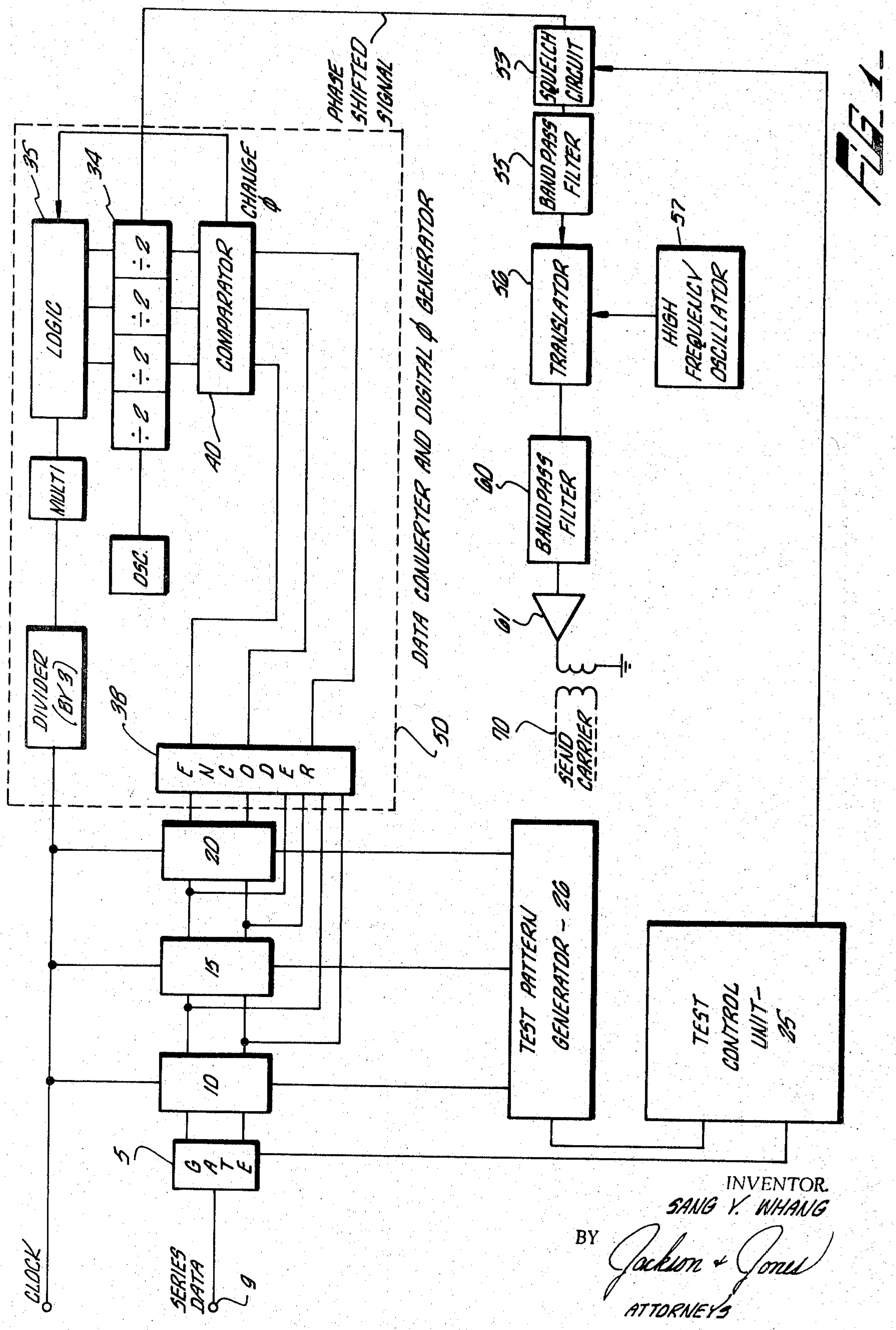
FIG. 1 is a block diagram of a transmitter for sending digital data test signals over a telephone line, and incorporating the principles of this invention.

Turning now to the drawing of FIG. 1, there is illustrated a transmitter which includes a 3-stage shift register including stages 10, 15 and 20 for receiving series binary data via input terminal 9. An input clock signal at the data rate is applied to stages 10, 15 and 20. This clock is normally available from the source of series binary data or it may be locally generated if so desired.

A data transmission gate 5 is connected between the series data input and stage 10. Test control unit 25 disables the transmission gate 5 when a test pattern generating operation at the transmitter is to take place. A test pattern generator 26, under control of the test control unit 25, applies a test pattern in parallel to stages 10, 15 and 20. This test pattern is converted into phase-shifted signals by a data converter and digital phase generator 50.

The data converter and digital phase generator 50 is fully described in the foregoing mentioned patent application entitled "Digital Angle Modem," and its operation need not be described in detail here. Briefly, however, an encoder 38 emits a desired phase angle representative of the data stored in stages 10, 15 and 20 by test pattern generator 26. A high frequency divider circuit 34 includes three muliphase output taps which are compared as to phase, relative to the phase levels emitted from an encoder 38 by a comparator circuit 40. The phase levels from encoder 38 are representative of the "ones" and "zeros" appearing in multibit groups of randomly appearing test data signals. Individual stages of divider circuit 34 are thereafter inhibited under joint command of comparator 40 and logic gates 35 so as to produce, at the output stage of circuit 34, a phase-shifted signal which includes differential phases from one modulation period to the next in accordance with the information-representing content of the test pattern signals.

During test pattern transmission, a squelch circuit 53 receives the phase-shifted output signal and responds to test control unit 25 by squelching the signals occuring during predetermined modulation periods. The phase-shifted signal, with certain modulation periods thereof squelched, thus appears as an amplitude modulated high frequency square wave as will be described in more detail hereinafter. This signal is applied to a bandpass filter 55 which eliminates high frequency harmonics. After filtering the signal is translated by the translator 56 and oscillator 57 to a low frequency signal by conventional heterodyning techniques. A bandpass filter 60 receives the low frequency test signal to an amplifier 61 for application to a communication link 70.

The communication link 70 may include, as a typical example, randomly selected unconditioned voice-grade telephone lines which have widely different phase and amplitude characteristics depending upon the fortuitous selection of various lines available from telephone systems throughout the country. It is these widely varying amplitude and delay characteristics which introduce significant distortion in transmitted signals such that data is lost and cannot be decoded at the receiver unless the line characteristics are compensated for so as to preserve the relationship of various frequency components which make up the transmitted data. It should be understood that a fixed equalizer as described in my co-pending patent application entitled "Band Limited Telephone Line Data Communication System," Ser. No. 565,214 filed July 14, 1966, may be employed in either the receiver or the transmitter to compensate to a large degree by utilizing fixed amplitude and delay sections having a corrective capability at a given frequency range depending upon the statistical average of all unconditioned lines. My fixed equalizer, although satisfactory for a great number of unconditioned telephone lines (particularly at data rates such as 2400 bits per second), nevertheless can be improved still further for military, foreign and severely unbalanced domestic lines by employing the variable equalizer of this invention alone or in combination with my fixed equalizer. With the variable equalizer of this invention, data rates of 4800 bits per second and higher can be transmitted with excellent error rates.

Figure 2:
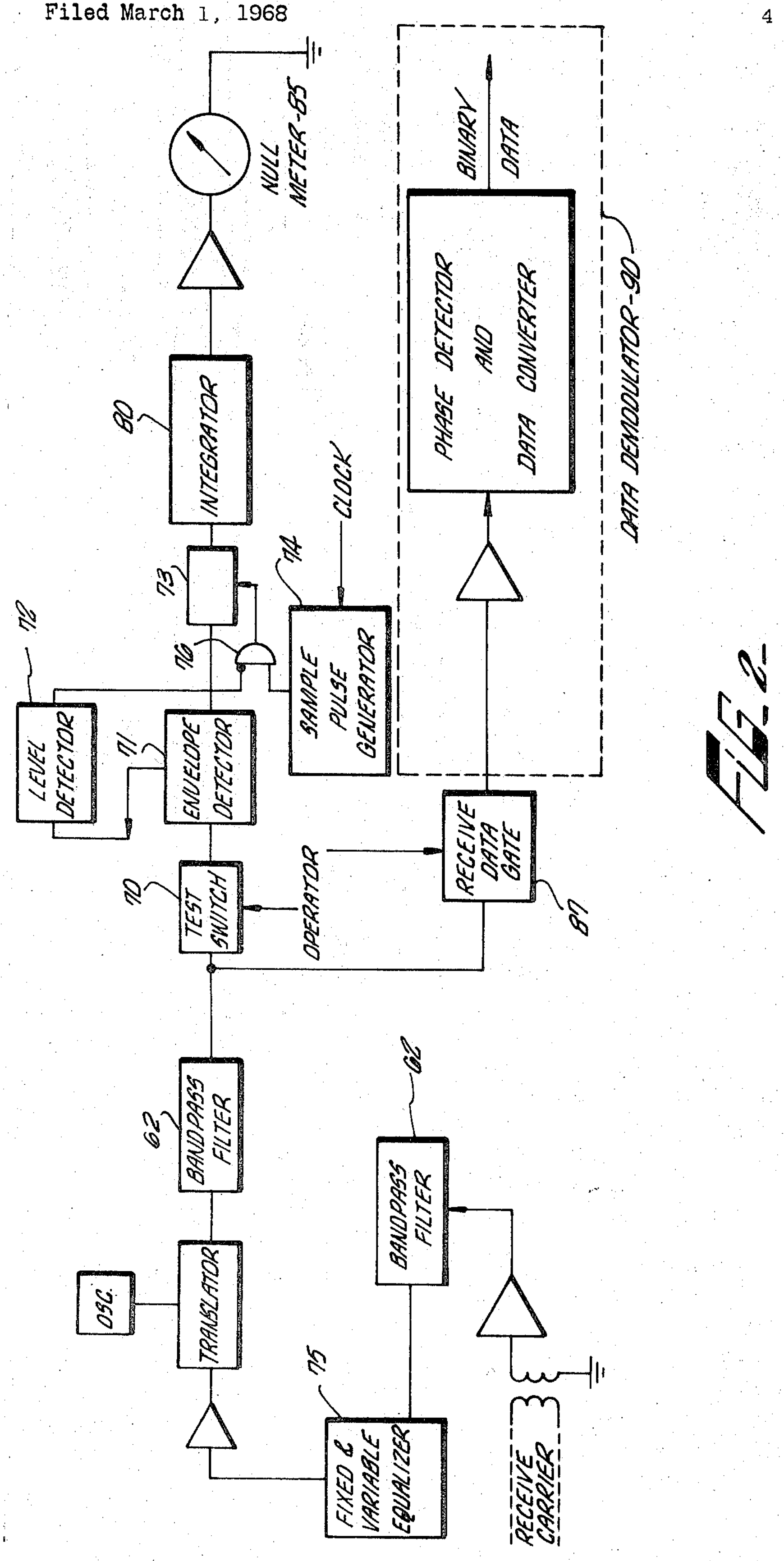
FIG. 2 is a block diagram of a receiver for use in conjunction with the transmitter of FIG. 1 and incorporating the principles of this invention.

Before discussing an equalizing operation for the receiver of FIG. 2, it is well to note that the fixed equalizer of the foregoing mentioned patent application was possible, in part, due to signal handling characteristics of narrow bandpass filters, such as filter 60 at the transmitter and filter 62 at the receiver of FIG. 2. The advantages resulting from employing such narrow bandpass filters are fully described in my co-pending patent application, and reference may be made thereto for the complete details. Briefly, however, such filters form a composite filter network which exhibits a linear phase over a narrow passband defined by the equation 1/Hz. with a center frequency at $f_0$, the carrier frequency. As typical examples, the carrier frequency, $f_0$, may be 1700 Hz. for transmission of either 2400 bits per second, or 4800 bits per second. The bandwidth will be less than 1000 Hz. for 2400 bits per second, and it will normally be in the order of 1600 Hz. for 4800 bits per second. The narrow bandwidth for the two typical given examples is thus approximately 1300 Hz. to 2100 Hz. for 2400 bits per second or 900 Hz. to 2500 Hz. for 4800 bits per second.

The foregoing examples of narrow bandwidths, as opposed to the wideband frequencies of the prior art, result in a simpler range of correction for both delay and amplitude. It follows that the amount of correction required for the bandwidths of this invention is less and, thus, fewer numbers of sections are required to obtain sufficiently accurate equalization. Such fewer sections represent a considerable savings in cost, and further represent a considerable savings in time, effort and result in a simplicity of adjustment.

Figure 3:
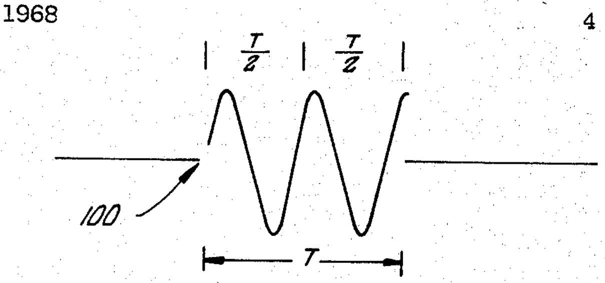
FIG. 3 and FIG. 4 illustrate a typical carrier and data modulated signal when subjected to a communication link having a narrow bandwith equal to $1/T$ Hz. with a center frequency of $f_0$, the carrier frequency.
Figure 4:
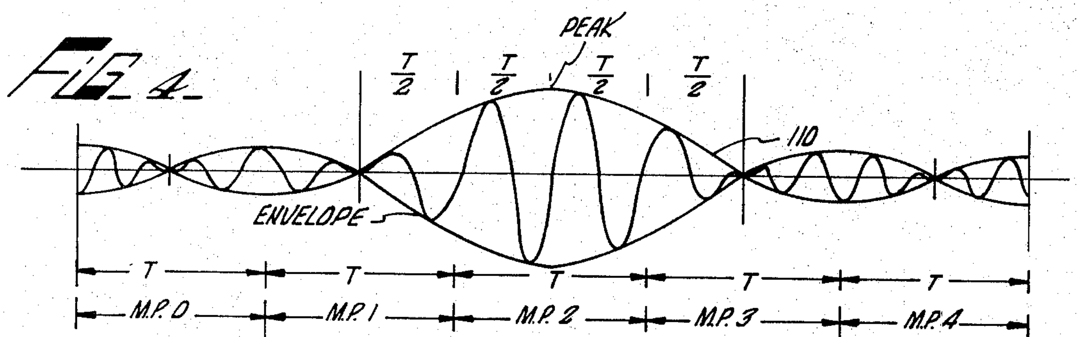

In any event, the filter characteristics as just defined convert a carrier signal 100, FIG. 3, to substantially the envelope 110 shown in FIG. 4. This envelope 110 under ideal equalization has a peaked amplitude at the middle of its modulation period M.P.2 and drops toward ZERO amplitude at the mid-points of adjacent modulation periods M.P.0 and M.P.1 and modulation periods M.P.3 and M.P.4. It should be understood that the envelope 110 depicted in FIG. 4 is assumed to be an idealized form, as would result from transmission of a single pulse formed during the modulation period M.P.2 only. It further assumes that no signals were present during preceding or succeeding modulation periods for at least the total response time of the communication link being tested. This unusual amplitude characteristic of envelope 110 of FIG. 4 provides one important feature in the variable equalizer operation of this invention, inasmuch as it represents a predictable reference which I apply to an unusual advantage in my invention. The low amplitude portion of envelope 110 at the centers of adjacent modulation periods M.P.0 and M.P.1, M.P.3 and M.P.4, etc., together with the simple test equipment described hereinafter, allow any line to be equalized within a matter of minutes by any unskilled person.

Figure 5A:
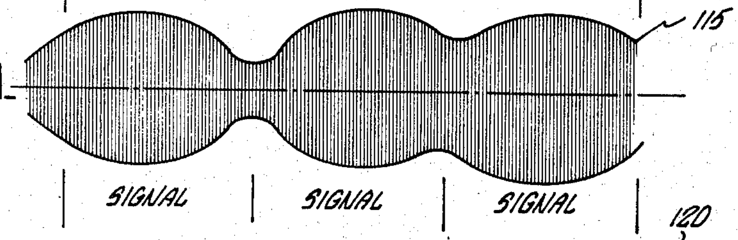
FIGS. 5A–C illustrate a series of non-equalized wave-forms useful in promoting a clearer understanding of the test pattern generator and NULL meter in accordance with the principles of this invention.
Figure 5B:
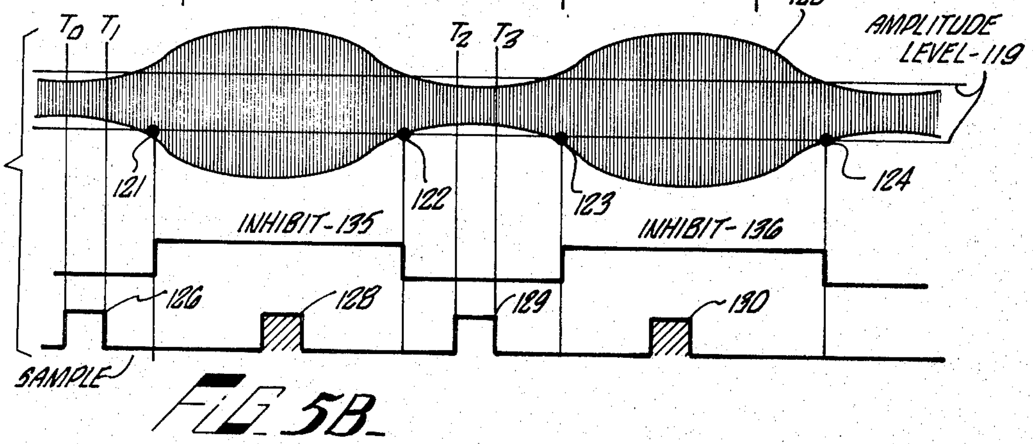

Reference to FIG. 5A discloses both a typical non-squelched envelope 115 as it would be received at a receiver, and a squelched envelope 120, FIG. 5B, as it would be received. Comparison of envelope 110 in FIG. 4 and envelope 115 in FIG. 5A shows a translation from a relative low frequency in FIG. 4 to a much higher frequency as shown in FIG. 5. This translation does not affect either phase or amplitude, but rather serves to define a much more reliable envelope and at the same time yield a greater number of cycles for a differential phase detection operation at the demodulator of the receiver.

In FIG. 5A, signal 115 does not have any modulation periods squelched since, as shown, signals would have been sent during each one of three successive modulation periods M.P.1 through M.P.3. These signals might typically represent phase differences of 180°, 45° and 90°, respectively. Received envelope 120, FIG. 5B, on the other hand, represents one portion of a typical test signal sent out during a variable equalizer operation. In such an instance, the test control unit 25, FIG. 1, would pass a given test signal in modulation periods M.P.1 and M.P.3 it would squelch entirely, by circuit 53, the signals during modulation periods M.P.0, M.P.2 and M.P.4. An operator, in order to equalize a randomly selected line, closes the test switch 80, FIG. 2, which applies the received test pattern 120, FIG. 5, to an envelope detector 71. An output terminal from the envelope detector 71 is applied as an input to a level detector 72.

Envelope detector 71 has an output signal which is either passed or blocked by transmission gate 73 depending upon the amplitude of the envelope during the sample interval in question. For example, whether or not the envelope 120 exceeds or fails to exceed the predetermined amplitude level range 119, determines the conduction state of that range, an output signal is emitted and for signals less than that range, no output signal is emitted. This predetermined range of amplitude for the threshold detector tectors have a predetermined amplitude range and exhibit the characteristic that for an input signal in excess of that range, an output signal is emitted. This predetermined range of amplitude for the threshold detector 72 is shown on the envelope 120 in FIG. 5B. Thus, at points 121, 122, 123 and 124 the predetermined amplitude range is exceeded by the envelope and inhibit signals 135 and 136, of duration shown, are applied to the inhibit lead of gate 76, FIG. 2. These inhibit signals 135 and 136 blocks the clock, or sample, pulses 128 and 130 as emitted by sample pulse generator 74 and shown shaded in FIG. 5B.

Prior to point 121, between points 122 and 123, and subsequent to point 124, the amplitude of envelope 120 is less than the threshold amplitude levels. Thus, at these times, sample pulses 126 and 129 pass through gate 76 and enable the transmission gate 73. With gate 73 enabled the portions of envelope 120 shown at intervals $T_0$ through $T_1$ and $T_2$ and $T_3$, FIG. 5B, are passed to integrator, or sample and hold circuit 80, FIG. 2.

It should be understood that this sample operation for applying selected portions of envelope 120 to integrator circuit 80 takes place many times per second in that the test pattern generator 26 at the transmitter location (FIG. 1) is continually signalling and squelching predetermined modulation periods of a test pattern. Accordingly, a minimum reading on the NULL meter 85 indicates to an operator that the equalizer adjustment he is adjusting at equalizer 75 has its amplitude or its delay characteristic set for optimum line equalizing results relative to the particular frequency range associated with that section as described in more detail hereinafter with reference to FIGS. 6 through 8.

Figure 5C:
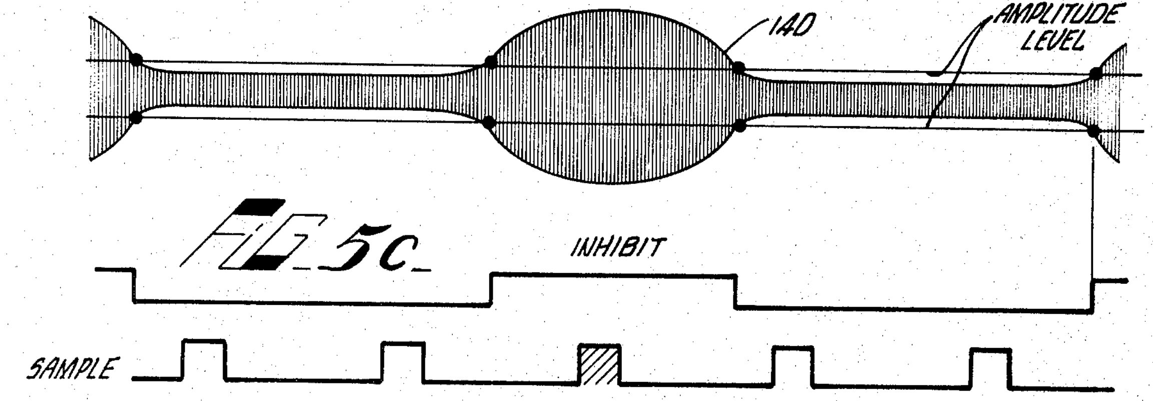
Figure 6:
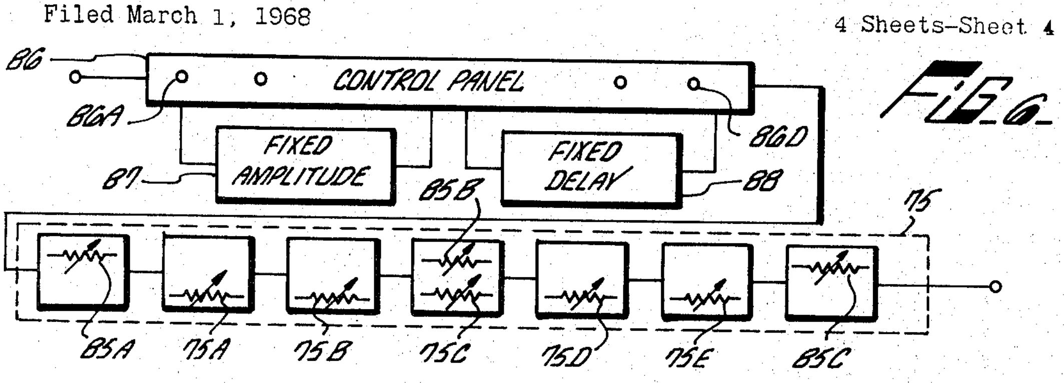
FIG. 6 is a block diagram illustrating a variable equalizer employing the principles of this invention.
Figure 7:
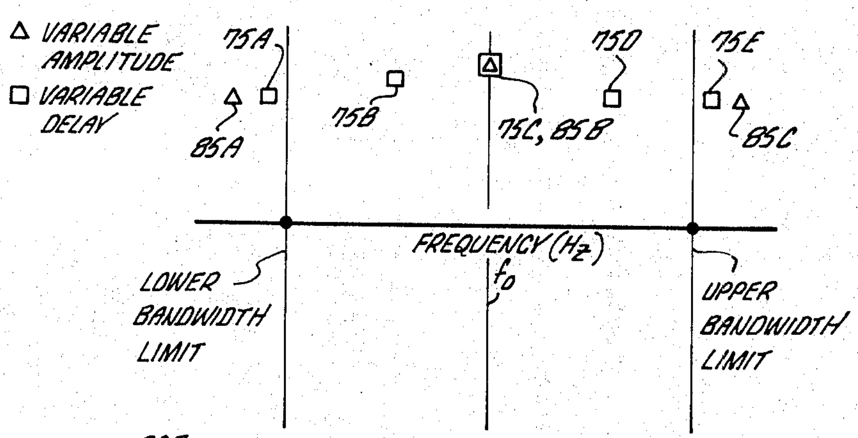
FIG. 7 is a frequency spectrum indicating the frequency positions for the amplitude and delay adjustments in the variable equalization of FIG. 6.
Figure 8:
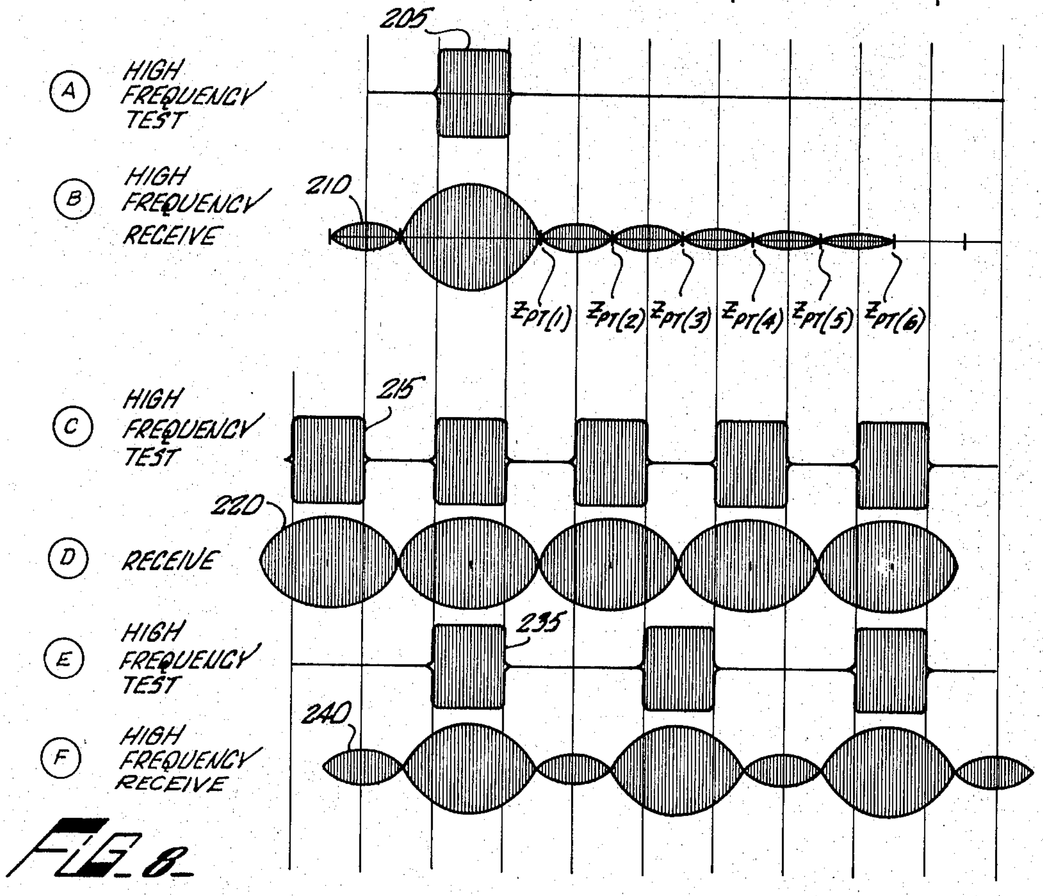
FIG. 8 is a series of equalized wave-forms useful in promoting a clearer understanding of the variable equalizer of this invention.

Prior to discussing FIGS. 6 through 8, it should be noted that envelope 140, in FIG. 5C indicates another test pattern which includes a non-equalized envelope having a transmitter signal preceded and followed by double squelched modulation periods. The purpose for employing these particular test patterns and squelched signal combinations of envelopes 120 and 140, are discussed hereinafter with respect to FIG. 8.

In FIG. 8, the equalized envelope 220, Row 8D, corresponds to the non-equalized envelope 120 of FIG. 5B. The equalized envelope 240, Row 8F, corresponds to the non-equalized envelope 140, FIG. 5C. In a similar manner envelope 210, Row 8B, of FIG. 8 is also an equalized envelope which corresponds closely to the idealized envelope 110 of FIG. 4.

As shown in FIG. 8, an amplitude modulated high frequency (I.F.) square wave 205, Row 8A, is produced at the output of the squelched circuit 53 during a single modulation period which includes numerous preceding and subsequent modulation periods devoid of any transmitted signal. The signal 205 after modification by the translator 56 and bandpass filter 60 is transmitted over the line 60. At the receiver, with the communication link properly equalized, envelope 210, has a peaked amplitude at the middle of its associated modulation period and collapses to ZERO at the middle of each preceding modulation period (only one is shown) and also collapses to ZERO at the middle of each succeeding modulation period shown as ZERO points, $Z_{pt(1)}$ through $Z_{pt(6)}$. Each succeeding envelope portion between ZERO points $Z_{pt(1)}$ through $Z_{pt(6)}$ is succeedingly smaller in amplitude and, thus, when a composite test signal is under consideration there is no significant contribution advanced by equalizing at ZERO points far removed from the primary modulation periods. When wave-form 215 is generated and I.F. envelope 220 is detected during an equalization operation, there is envelope sampling as described earlier, which checks ZERO points $Z_{pt(1)}$, $Z_{pt(3)}$, $Z_{pt(5)}$. Checking odd-numbered ZERO points beyond $Z_{pt(5)}$ is not necessary to obtain adequate equalization because the signal contribution, whether equalized or not at these far removed points, is minimal. When wave-form 235 is transmitted and envelope 240 is received during an equalizing operation, there is envelope sampling at $Z_{pt(1)}$, $Z_{pt(2)}$, $Z_{pt(4)}$, and at $Z_{pt(5)}$. Accordingly, these two patterns permit full range sampling for equalization which experience has shown is highly satisfactory. Of course, still further test pattern series may be employed if further refinement in equalization is required.

An operator's adjustment of the variable equalizer 75 at the receiver location shown in FIG. 2, may more fully be appreciated by reference to the drawing in FIG. 6 wherein it is assumed that at the receiver continuous repetitive test patterns such as I.F. envelopes 120 and 140 are being detected. In FIG. 6, the variable equalizer 75, is shown including five delay control sections 75A, 75B, 75C, 75D and 75E. These delay sections are well known to the prior art. Each delay section, for example, may be an active all-pass network with its delay peak at a predetermined frequency location as shown by the squares indicated by the legend and the frequency chart of FIG. 7. Adjustment of a resistor of each section varies the magnitude of the peak delay. For the communication link of this invention, the upper and lower bandwidths are shown in FIG. 7, and each bandwidth frequencies define the locations within which signal energy is present and requires equalization. The narrow bandwidth nature of the frequency spectrum in accordance with this equalization invention eliminates a great number of sections as commonly required by the prior art. For example, the number of sections of my equalizer is about one-half the number of sections employed by prior art equalizers.

The variable equalizer 75 also includes a pair of tandem-connected amplitude control sections 85A through 85C. Such amplitude control sections are also well known to the prior art and are capable of variably regulating the amplitude response at selected frequency ranges shown by the appropriately-labeled triangles in the frequency spectrum of FIG. 7. The amplitude control section 85B is an integral part of the delay section 75C and both sections 85B and 75C are designed to adjust their respective amplitude and peak delay response of the signals located substantially at the carrier frequency, $f_0$. Each one of the eight adjustable resistors are tweaked by an operator in a random sequence, several times until the NULL meter 85 is at a minimum reading as the test pattern is continuously received in the operation described hereinabove.

It was mentioned hereinbefore that a fixed equalizer of my earlier patent application may be combined with variable equalizer 75 to increase the dynamic range of equalization in a simple and highly efficient manner. The combined fixed and variable equalizer is depicted in FIG. 6 and includes the variable equalizer 75 described above, and the control panel 86, and a separate fixed amplitude corrective section 87 and another separate and fixed delay section 88. Sections 87 and 88 are connected to control panel 86 which receives an input signal and includes an output terminal connected to the variable equalizer 75. Control panel 86 includes a plurality of control switches 86A through 86D which may be selectively closed or opened by an operator during equalization of a communication network. Switches 86A through 86D select either amplitude section 87 alone, or delay section 88 alone. As an alternative such switches may select both sections 86 and 88 in tandem or neither one of sections 87 and 88 depending upon the particular line in question.

Telephone lines that may be encountered are generally of two distinct types, (1) those that have not been conditioned at all as to delay or amplitude characteristics; or (2) those that have been conditioned to a minimum amplitude and delay specification which is, nevertheless, far from satisfactory for data communication at high bit rates even over the limited bandwidth taught by this invention. Selective combination of fixed and variable equalizers 75, 87 and 88 expands the range of equalization available. The fixed equalizers 87 and 88 may be considered as a broad, or coarse, adjustment in either (or both) amplitude and delay characteristics required. In addition, the variable equalizer 75 may be considered as a fine, or vernier, adjustment in either or both of amplitude and delay as needed. Because the line conditions are so varied either, both or none of the fixed delay and amplitude sections may be required to compensate for a broad adjustment so as to obtain the required speed, flexibility and simplicity in compensation taught by this invention.

The procedure for equalization is pre-established to a certain extent in that all equalizer sections fixed and variable are adjusted without any line whatever involved so as to exhibit a completely flat amplitude and delay characteristic for a given knob position on the equalizer combination. As test signals are being received, and before adjusting any of the resistors of variable equalizer 75 each one of the positions 86A through 86D on control panel 86 is selected. Whichever position gives the lowest reading on the NULL meter is selected. Thus, any of the foregoing enumerated combinations of the fixed amplitude and delay sections 87 and 88, respectively, are available and once selected, that fixed adjustment is continually employed for that particular line. Thereafter, the adjustments with the resistors of variable equalizer sections 75A through 75E and sections 85A through 85C continue in the manner described hereinbefore.

At the conclusion of adjustments by the operator for all eight variable resistors of variable equalizer 75, the system has been customized for the fortuitously selected telephone line connecting the transmitter and receiver. Such adjustment, even by an unskilled person, is normally performed within approximately two to three minutes to equalize unconditioned telephone lines, as compared to an adjustment time of an hour or more for highly skilled operators using complicated scopes and much more elaborate testing apparatus.

After equalization has been obtained in accordance with the foregoing description, the operator opens test switch 68 and closes the receive data gate 87 at the receiver unit. The receiver is then in proper condition for decoding the high-speed data sent from the transmitter during its normal communication operation. Receiver circuit of FIG. 2 includes a data demodulator unit 90, the operation of which is fully described in the patent application entitled "Digital Angle Modem" and thus its operation need not be repeated here.

The subject invention has been described with reference to certain preferred embodiments; it will be understood by those skilled in the art to which the invention pertains that the scope and spirit of the appended claims should not necessarily be limited to the embodiments described in detail herein.

What is claimed is:

1. In a data transmission system having a transmitting device for generating a phase-modulated signal representative of the data signals to be transmitted and a receiving device connectable together in a signal transmission link and wherein the received signal has a known shape when received over an equalized link, said known shape including a minimum amplitude at predetermined points of adjacent precedent and successive modulation periods when the modulated signal is squelched at the transmitting device during such adjacent periods, the combination which comprises:

signal blanking means at the transmitting device for transmitting a phase-modulated signal during a modulation period and for squelching the modulated signal during preselected modulation periods including at least one precedent and one successive modulation period adjacent said modulation period which includes said transmitted signal;

variable equalizing means connected in the signal transmission link for varying the delay and amplitude characteristics of said link at preselected frequency locations; and means in the signal transmission link for measuring the amplitude of the received signal at said points of said preselected modulation periods whereby the equalizing means may be varied at said preselected frequency locations to minimize the amplitude of the received signals at said points.

2. A data transmission system as defined in claim 1 wherein:

said predetermined points are located about the center of said precedent and successive modulation periods, adjacent to a signal-containing modulation period.

3. A data transmission system as defined in claim 2 wherein the signal blanking means squelches the phase modulated signal during every other modulation period.

4. A data transmission system as defined in claim 2 wherein the signal blanking means squelches at least double modulation periods successive and precedent to modulation periods including transmitted signals.

5. The combination as defined in claim 2 wherein the signal blanking means squelches the phase modulated signal during every other modulation period for a selected time interval and squelches the data signal during two out of three modulation periods for another selected time interval.

6. A data transmission system as defined in claim 2 wherein the means for measuring the amplitude of the received signal includes means for repetitively sampling amplitude at said points, and a null meter coupled to the sampling means and responsive thereto indicates a minimum reading for optimum equalizer variations at said preselected frequency locations.

7. A data transmission system in accordance with claim 6 wherein said sampling means additionally comprises:

an integrator circuit connected to receive said sampled amplitudes and supply an integrated signal output to said null meter.

8. A data transmission system as defined in claim 7 wherein said sampling means further comprises:

level detecting means having a predetermined amplitude level; and signal inhibiting means connected to said detecting means for inhibiting transmission of the received signal to the integrating means when the amplitude of the received signal at said predetermined points exceeds said predetermined level of said level detecting means.

9. A data transmission system in accordance with claim 1 wherein the signal transmission link is formed by a telephone line randomly selected from among a plurality of telephone lines each having signal transmission characteristics which vary widely from each other over the respective bandwidth and each of which have substantially matched amplitude and delay characteristics over a selected narrow bandwidth.

10. A data transmission system in accordance with claim 9 wherein:

all of the telephone lines exhibit, for said selected narrow bandwidth an average line amplitude and delay characteristic compensatable by a fixed filter; and wherein said equalization means comprises a fixed amplitude correction network and a fixed delay correction network selected to equalize said system for said average amplitude and said average delay line characteristics, respectively.

11. A data transmission system in accordance with claim 10 wherein said equalizer means further comprises:

a variable equalizer section connectable to said fixed amplitude and fixed delay correction networks, said variable section having a plurality of pre-adjusted amplitude and delay networks variable by variable taps; and switching control means operable to connect in series any desired combination of said fixed amplitude and/or said fixed delay sections to said variable equalizer section for providing an initially low null meter reading during receipt of said test signals.

12. In a data transmission system having a transmitting device and a receiving device connectable together in a signal transmission link, the combination which comprises:

means at the transmitting device for generating a carrier wave modulated with digital data levels to be transmitted, the carrier wave having a predetermined modulation period;

means at the transmitting device for applying the data modulated signals to the transmission link;

blanking means at the transmitting device for squelching the transmitted signal during preselected modula- periods;

means at the receiving device for demodulating the data modulated signal received over said link;

variable equalizing means connected in the signal transmission link between the modulating and demodulating means for varying the delay and amplitude characteristics of said link; and means in the signal transmission link for measuring the amplitude of the transmitted signals at substantially the middle of said preselected modulation periods, whereby the variable equalizing means may be controlled to optimize the equalization of the link between the modulating and demodulating means.

13. The combination as defined in claim 12 wherein the variable equalizing means includes at least five variable delay circuits and three variable amplitude circuits, one delay circuit and one of the amplitude circuits being tuned at $f_0$, one of the delay circuits being tuned at a frequency between $f_0$ and $$f_0+\frac{1}{T}\ \mathrm{H_z}$$

one delay circuit being tuned at a frequency between $f_0$ and $$f_0+\frac{1}{T}\ \mathrm{H_z}$$

one delay and one amplitude circuit being tuned a frequency greater than $$f_0+\frac{1}{T}\ \mathrm{H_z}$$

and one delay and one amplitude circuit being tuned at a frequency less than $$f_0+\frac{1}{T}\ \mathrm{H_z}$$

where:

$f_0$ is the carrier frequency, T is the modulation period, and Hz. is cycles per second.

14. The combination as defined in claim 12 including means at the transmitting device coupled to the modulating means for generating a predetermined pattern of digital data levels to be transmitted.

15. The combination as defined in claim 14 wherein the signal blanking means squelches the analog signal during every other modulation period for a selected time interval and squelches the data signal during two out of three modulation periods for another selected time interval.

16. The combination as defined in claim 10 wherein the means for measuring the amplitude of the received signal includes means for rectifying the received analog signal, means coupled to the rectifying means for integrating the rectified signal and a null meter coupled to the integrating means for indicating the amplitude of the received signal at said predetermined points.

17. The combination as defined in claim 16 wherein the means for measuring the amplitude of the received signal includes level detecting means and signal inhibiting means connected in the signal transmission link for inhibiting transmission of the received signal to the integrating means when the amplitude of the received signal at said predetermined points exceeds a preselected level.

18. A method of equalizing a transmission link connected between a transmitter and a receiver wherein the transmitted signal is a modulated carrier wave and the modulated signal received over an equalized link at the receiver has a known shape with a minimum amplitude at predetermined points of adjacent precedent and successive modulation periods when the modulated signal is squelched at the transmitter during such adjacent periods, comprising the steps of:

squelching the modulated signal at the transmitter during preselected modulation periods;

measuring the amplitude of the received signal at said points of said preselected modulation periods; and varying the delay and amplitude characteristics of said link at preselected frequency locations to obtain a minimum amplitude signal at said points of said preselected modulation periods.

19. A method in accordance with claim 18 and including the further step of:

squelching the modulated signal at the transmitter during every other modulation period and transmitting a signal in the modulation period between said squelched periods.

20. A method in accordance with claim 18 and including the further step of:

squelching the modulated signal at the transmitter during at least double modulation periods on adjacent precedent and successive modulation periods; and transmitting a signal in the modulation period between said squelched periods.

21. A method in accordance with claim 18 including the further step of:

inhibiting the amplitude measuring step when a non-squelched signal is received at the receiver.

22. A method of equalizing a transmission link connected between a transmitter and a receiver wherein the transmitted signal is a phase-modulated carrier wave and the modulated signal when received over an equalized link at the receiver has a known shape with minimum amplitude at predetermined points of adjacent precedent and successive modulation periods when the modulated signal is squelched at the transmitter during such adjacent periods comprising the steps of:

squelching the phase-modulated signal at the transmitter during preselected modulation periods;

measuring the amplitude of the received signal at said points of said preselected modulation periods; and varying the delay and amplitude characteristics of said link at preselected frequency locations to obtain a minimum amplitude signal at said points of said preselected modulation periods.

References Cited

UNITED STATES PATENTS

| | | | |
|---|---|---|---|
| 3,311,836 | 3/1967 | Di Toro | 325—42 |
| 3,335,223 | 8/1967 | Johannesson et al. | 325—42 |

ROBERT L. GRIFFIN, Primary Examiner

A. J. MAYER, Assistant Examiner

U.S. Cl. X.R.

325—42; 333—18

UNITED STATES PATENT OFFICE

CERTIFICATE OF CORRECTION

Patent No. 3,550,005 Dated December 22, 1970

Inventor(s) Sang Y. Whang

It is certified that error appears in the above-identified patent and that said Letters Patent are hereby corrected as shown below:

| Column | Line | |
|---|---|---|
| 3 | 40 | "muliphase" should be "multiphase" |
| 4 | 31 | "1/Hz" should be "1/T Hz" |
| 5 | 35 | before "of that range" the following has been omitted: "of transmission gate 73. Level detectors such as level detector 72 are, of course, well known. Such level detectors have a predetermi amplitude range and exhibit the characteristic that for an input signal excess" |
| 5 | 36 | omit "This predetermined range of amplitude for the threshold detector tectors have a predetermined amplitude range and exhibit the characteristic tl an input signal is in excess of that range, an output signal is emitted" |
| 9, | 74 | equation should read: "$f_o - \frac{1}{T}$ Hz" |
| 10, | 1 | "at" should be inserted after "tuned" |
| 10, | 13 | equation should read: "$f_o - \frac{1}{T}$ Hz" |

Signed and sealed this 8th day of June 1971.

(SEAL)
Attest:

EDWARD M. FLETCHER, JR.
Attesting Officer

WILLIAM E. SCHUYLER, JR.
Commissioner of Patents